(12) United States Patent
Flora-Holmquist et al.

(10) Patent No.: US 6,253,112 B1
(45) Date of Patent: Jun. 26, 2001

(54) METHOD OF AND APPARATUS FOR CONSTRUCTING A COMPLEX CONTROL SYSTEM AND THE COMPLEX CONTROL SYSTEM CREATED THEREBY

(75) Inventors: Alan Robert Flora-Holmquist, Batavia; Edward Morton, Oswego; James Day O'Grady, Aurora, all of IL (US); Mark Gerard Staskauskas, Del Mar, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/154,339

(22) Filed: Sep. 17, 1998

(51) Int. Cl.[7] .................................................. G05B 11/01
(52) U.S. Cl. ................................. 700/19; 700/12; 700/18
(58) Field of Search ................................. 700/12, 18, 19, 700/28

(56) References Cited

U.S. PATENT DOCUMENTS 5,463,543 * 10/1995 Wagner ................................... 700/12
5,473,531 * 12/1995 Flora-Holmquist et al. ............ 700/28
5,623,680 * 4/1997 Flora-Holmquist et al. ............ 712/232
5,640,319 * 6/1997 Beuning et al. ........................... 700/2

* cited by examiner

Primary Examiner—William Grant
Assistant Examiner—Victoria Robinson
(74) Attorney, Agent, or Firm—Jack R. Penrod

(57) ABSTRACT

A method of and apparatus for constructing a control system and a control system created thereby which is based on multiple finite state machines, each in turn based on a finite state machine with constant code (FSMcc). An input preprocessor module normalizes input signals as required by the finite state machine logical processing unit. An output postprocessor module changes the normalized finite state machine outputs to real signals required by the controlled process or apparatus. The input preprocessor allows for a different finite state machine required for an application to be executed by the same constant code contained in the FSMcc microcode storage. An application logic table for the FSMcc is constructed using a specific organization of data representing application logic conditions. The ability to control a process or apparatus with multiple finite state machines allows the designer to use the FSMcc technology more widely and in more complex situations.

3 Claims, 4 Drawing Sheets

| FSM NAME | INPUT PREPROCESSOR | OUTPUT POSTPROCESSOR | RAM REQUIRED | RAM INITIALIZER |
|---|---|---|---|---|
| FANcontroller | CONTimap | CONTomap | 200 BYTES | CONTinit |
| FANmotor | MOTORimap | MOTORomap | 50 BYTES | MOTORinit |
| FANlight | LIGHTimap | LIGHTomap | 20 BYTES | LIGHTinit | ns
METHOD OF AND APPARATUS FOR CONSTRUCTING A COMPLEX CONTROL SYSTEM AND THE COMPLEX CONTROL SYSTEM CREATED THEREBY

FIELD OF INVENTION

The present invention relates to a complex computer driven system where the problem of control is of significant importance, and more particularly to such computer systems handling multiple real time tasks.

BACKGROUND OF THE INVENTION

A previous computer control system is shown and described in U.S. Pat. No. 5,301,100 entitled "Method of and apparatus for constructing a control system and control system created thereby" that issued to Ferdinand H. Wagner on Apr. 5, 1994, the disclosure of which is hereby incorporated by reference.

The majority of computer control systems require programming for each application. The process of programming is error-prone and requires testing of implemented logic and the correctness of program statements which express this logic. The pure logic of the application is deeply buried in the program code. There is no known way to isolate the logic design from peculiarities of the programming language and its data representation.

The alternatives to systems which are programmed are systems which are specified. The advantages of control systems which are specified in comparison to systems which are programmed are well known and summarized e.g. by Davis in "A Comparison of Techniques for the Specification of External System Behavior", Communications of the ACM September 1988 pp. 1098–1115. Also as taught in reference U.S. Pat. No. 4,796,179 a control system can be built using subroutines describing standard control blocks. The subroutines are then linked together into the control system. Another approach is based on table driven finite state machines which are specified. This is suitable for systems intended for applications characterized by a high number of control decisions.

As shown in the article by Davis for the table approach, boolean tables grow exponentially with the number of input and states. Because of this well known growth phenomena, a table driven approach has been limited to rather simple applications. Typically, only selected subsystems of a complex system are implemented as table driven finite state machines.

Input signals come to a control system from different analog and digital sensors. The signals are often of different natures: some are digital, others are analog. The digital signals are two-valued (boolean) or multivalued (numbers). The analog signals in their original form are of no use in a digital control system. Only some specific values of an analog signal are relevant for control purposes. A table driven state machine can process digital information only. Therefore, the use of table driven systems was limited to applications where input has a standard boolean form until the patent of Wagner. The disadvantages of the finite state machine (FSM) of Wagner and similar FSMs is that multi-FSM environments were created in an ad-hoc way with static FSM instances and these FSMs involved considerable overhead to create the necessary platform, so they were very rarely used. The FSM previously had to have all supporting code (about 3,000 lines) written by hand.

Therefore, it is an object of the present invention to provide a method and apparatus for providing a system of multiple cooperating finite state machines.

It is another object of the present invention to provide a method and apparatus for providing a system of multiple cooperating finite state machines with supporting code.

SUMMARY OF THE INVENTION

Briefly stated, in accordance with one aspect of the invention, the aforementioned problems are overcome and an advance in the art achieved by providing a method of specifying a control system for a process or an apparatus to be controlled. The method includes the steps of identifying multiple detectable conditions associated with the controlled process or apparatus; providing multiple finite state machines to control the controlled process or apparatus, each finite state machine having a name and each finite state machine having an input preprocessor, an application logic table and an output post processor; providing each finite state machine with separate input names for each detectable condition controlled by the respective finite state machine wherein the presence of the respective detectable conditions is indicated by the respective names having an asserted value; storing the input names; identifying one or more control actions which can be taken by each finite state machine to control the process or apparatus; providing a separate output name for each identified control action of each finite state machine; storing the output names; automatically producing a application logic tables for each finite state machine, respectively, wherein each input name is represented by a predetermined number of bit positions and combinations of input names are logically coupled together by implied AND and OR operators and wherein such combinations of input names are associated with output names; storing the tables; and loading each of the application logic tables into the control system. Using these steps, control systems running multiple finite state machines waiting for the combination of inputs and outputs that will cause one of the finite state machine to be active and control the process or apparatus. Each of the finite state machines is straightforwardly provided, since each of the multiple finite state machines is automatically provided by operation of community specifications on inputs and outputs.

BRIEF DESCRIPTION OF THE DRAWING

In the drawings, closely related figures have the same reference numerals but different alphabetic suffixes.

FIG .4 is a flow chart of the operation of the FSM Manager.

Figures 5, 6:
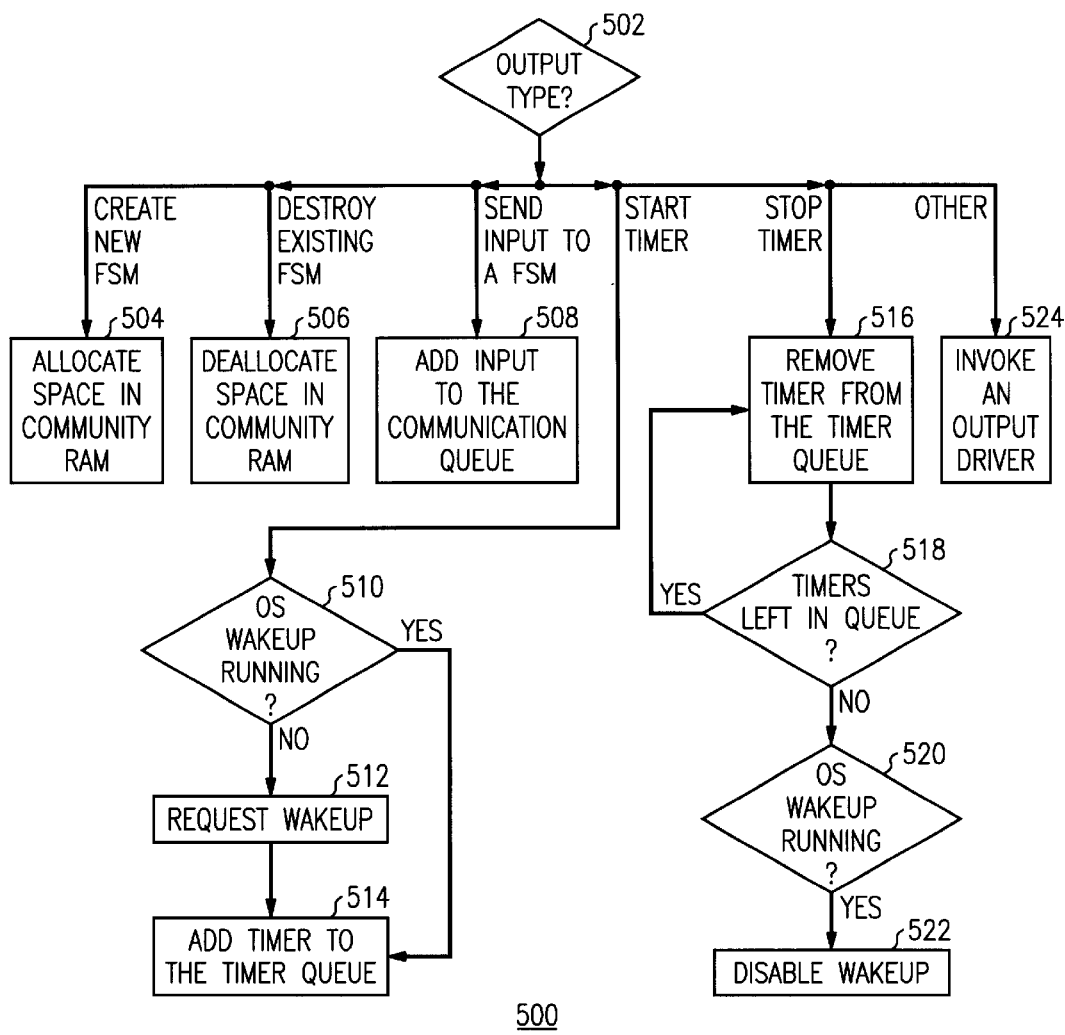

FIG. 5 is a flow chart for providing the correct output and execution for each input.

FIG. 6 is a table showing examples of names used and FSM RAM required when testing the present invention.

GENERAL DESCRIPTION OF THE INVENTION

The present invention applies to computer driven systems which consist of multiple finite state machines. The aim of the invention is to build a control system where the control logic is specified in a standard form rather than programmed in any particular language. In the present invention each FSM is stored in system storage. Each FSM includes an input preprocessor, a FSMcc, an application logic table and an output postprocessor. The program executing the table is constant. The constant execution program is stored in a ROM-type memory in order to assure maximum execution speed.

An important feature of the present invention is that all input signals are brought to a uniform or normalized representation form referred to as "names." Engineering knowledge is required to produce these names. These names are generated by an input preprocessor in the form required by a Finite State Machine with Constant Code (FSMcc). The input preprocessor extracts the names from the input signals. According to Wagner, there exists no general solution for construction of the input preprocessor and the output postprocessor in the literature. The output postprocessor produces the real output signals or performs some actions according to names generated by the finite state machine.

It is assumed in the technical literature that increasing the number of input signals will always require significant increase of memory size. This is indeed true for a pure boolean table representation. The present invention uses input signals in an affirmative form. This leads in a number of cases to substantial reduction of memory size.

The technical literature takes it for granted that increasing the number of boolean operators which are used leads to an optimized form of logical conditions. This appears to be obvious. Based on this assumption, the manufacturers of integrated circuits produce a range of gates which cover all possible boolean operations: AND, OR, NOR, NAND, EXCLUSIVE-OR, NOT, AND-OR-INVERT, etc. This eases the design of circuits by requiring a minimal number of elements. This assumption is correct for systems not exceeding a certain level of complexity. Surprisingly, the present invention demonstrates that limiting the number of boolean operators to two (AND and OR) can be a better approach. This creates a necessary environment for minimizing the memory size containing the logic conditions. This very limited number of boolean operations allows standardization of input signals in an affirmative form and a specific way of storing the logical condition in memory. The AND and OR boolean operators which are used are not explicitly present in the memory which contains the logic conditions. They are implied by an assumed form of the stored conditions. These two features of the present invention lead to a reduction of the memory requirements for storing logic conditions. Thus, using the present invention a control system with hundred of inputs can be implemented as a fully table driven hardware circuit or software program as shown by the Wagner patent.

The uniform representation of control information does not mean that the number of input signals (names) is minimal. Contrarily, in the case of boolean signals the normalization process may replace one boolean signal with two names. The true advantage is gained in the representation of logical conditions. Names allow for a specific representation of logical conditions. These conditions are stored in tables with significantly smaller sizes. The reduction of table size directly decreases the cost of memory used. In many cases this reduction of table size is so significant that it makes the implementation of a table based system economically feasible.

The size of pure boolean tables as presented in the prior art references cited above would not allow building a system as presented in this invention. An important feature of this invention is that the transition table constructed for the finite state machine uses a new representation of transition conditions. This new representation of transition condition allows building transition tables with reasonable sizes.

Therefore, the present invention allows a design of a finite state machine with constant code (the abbreviation FSMcc is used in this description).

Using the present invention the entire control information is contained in data tables. Hence, a wide range of control system modifications is possible without changing the rest of the system. Only the content of memory storing the application control information must be modified.

Still another important feature of systems using the present invention results from the fact that data tables contain control information in a symbolic form (names). The control information expressed by input and output names presents the true application know-how. This information is independent of the language, data base, operating systems, and input-output interfaces used for implementing the control system. Thus, this form of the application know-how is highly portable. It makes possible the reuse of developed subsystems.

For complex controlled processes or apparatus a multiplicity of finite state machines is required, each machine (if implemented as FSMcc) is executed by the same constant program. The input preprocessor parameters, the logic specification tables and output post processor parameters for different FSMccs vary. The organization of each input preprocessor, logic specification table and output post processor representing each respective FSMccs is the same.

The use of finite state machines was previously limited to simple applications with a small number of states and inputs. The present invention based on FSMcc, may not be a solution for all control problems. But it decisively expands the complexity of applications which can be implemented as a system with a constant code. Design of a fully table based system reduces the debugging effort to testing the application only. The execution part of such a system is designed only once for the entire class of applications.

DEFINITIONS

Terms used in this application have the following meanings:

| | |
|---|---|
| Combinational system | Output is determined by input. |
| Sequential system | Output is not determined by input itself. State and input determine output. |
| State | Represents the past (history) of a sequential system. |
| Moore model | Sequential system which has outputs determined by a state. |
| Mealy model | Sequential system which has outputs determined by a state and inputs. |
| Entry action | Output change when entering a state. |
| Exit action | Output change when exiting a state. |
| Input action | Output change when input changes. |
| Finite state machine | Sequential system. |

Note that the term "finite state machine" is known and used in the technical literature. There are two definitions used. According to the definition used in this description a finite state machine is another name for a sequential system. This view is represented in many books as for example in *SWITCHING AND FINITE STATE AUTOMATA THEORY* by Kohavi, McGraw-Hill 1970. The other definition says that a finite state machine covers both combinational and sequential systems.

DETAILED DESCRIPTION OF THE INVENTION

Figure 1:
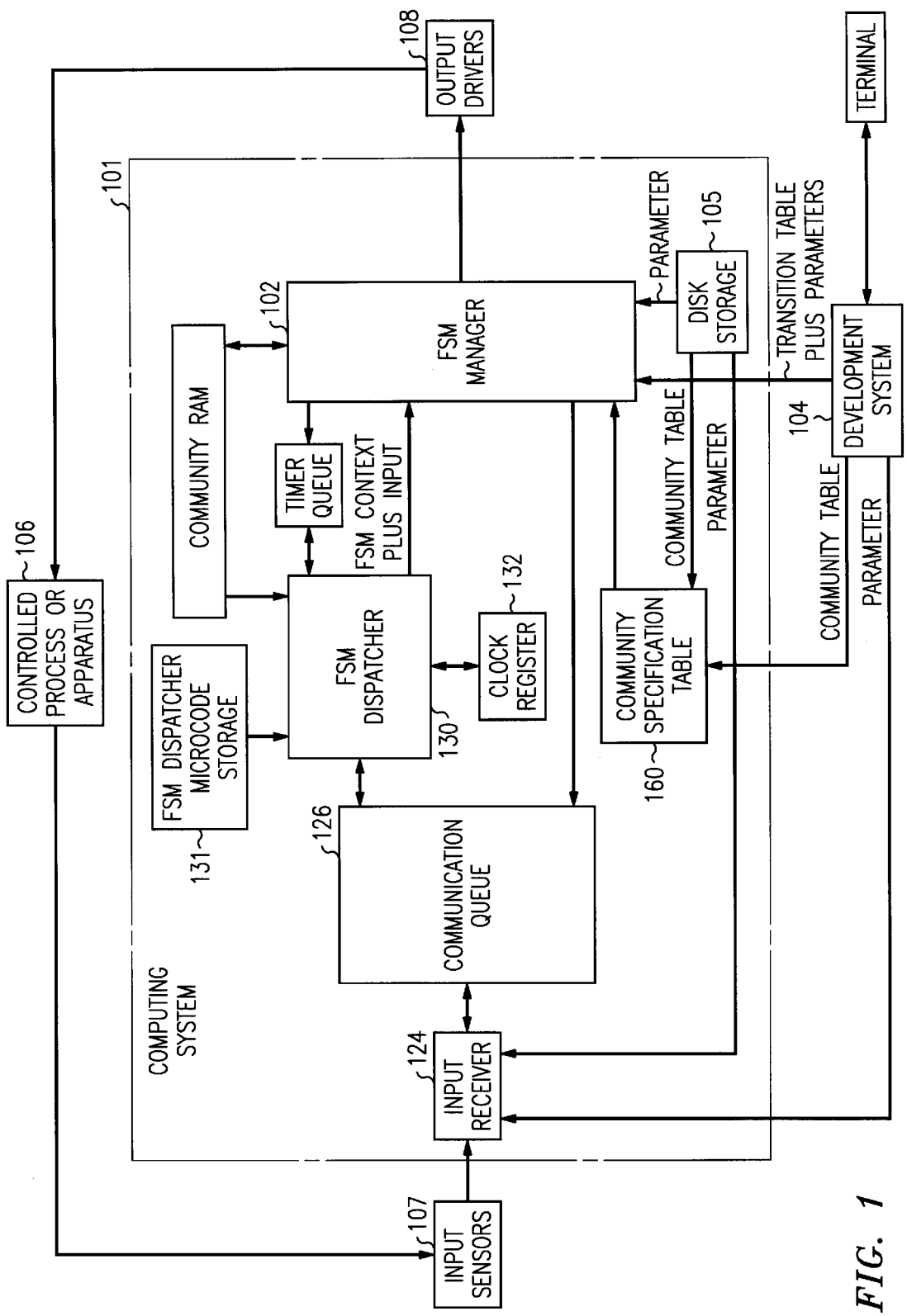
FIG. 1 is a block diagram of the control system based on multiple finite state machines.
Figure 2:
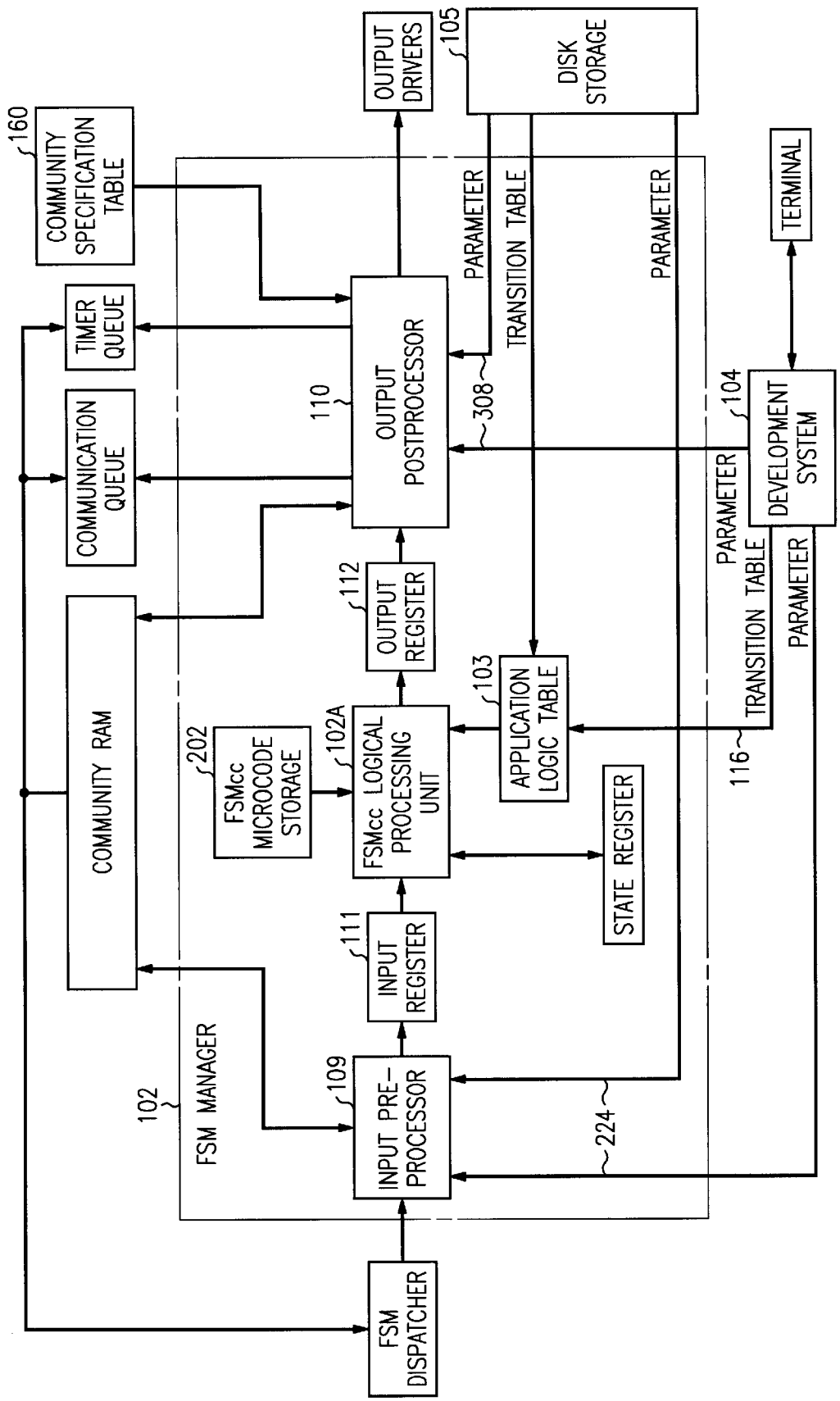
FIG. 2 is a partial broken away FIG. 1 showing greater details of the FSM Manager.

Referring to FIGS. 1 and 2, a control system 101 and the method and apparatus for constructing the control system according to the invention is generally illustrated. It is based on FSM Manager 102 and FSMcc 102A both which are shown in detail in FIG. 2. FSMcc 102A executes a constant code which is stored for example in microcode storage 202, preferably ROM-memory for greater execution speed. The FSMcc 102A execution code is independent from the application details. The behavior of the control system 101 is determined by is determined by the content of a transition table 116 stored in the application logic table 103, suitably RAM-memory. Transition table 116 may be downloaded from a development system 104. If the FSMcc uses a system with a disk storage 105, the transition table 116 can be loaded from the disk storage 105. The computing system 101 controls the process 106. It receives inputs from the controlled process or apparatus 106 by means of input sensors 107. It produces outputs which are supplied to the process 106 by means of output drivers 108. Input register 111 stores names produced by input preprocessor 109. Output register 112 stores names produced by FSMcc 102A.

Computing system 101 is capable of handling complex processes and apparatus. To accomplish this, multiple finite state machines are used. To handle the multiple finite state machines, computing system 101 has an FSM dispatcher 130. The FSM dispatcher is operated with microcode from an FSM dispatcher microcode storage unit 131 to dispatch input data to the FSM manager 102.

The input sensors 107 supply signals to the control system 101. These signals pass through the input receiver 124 and communication queue 126 to arrive at FSM dispatcher 130. These input signals are of different natures and generally comprise excessive information components.

Figure 3:
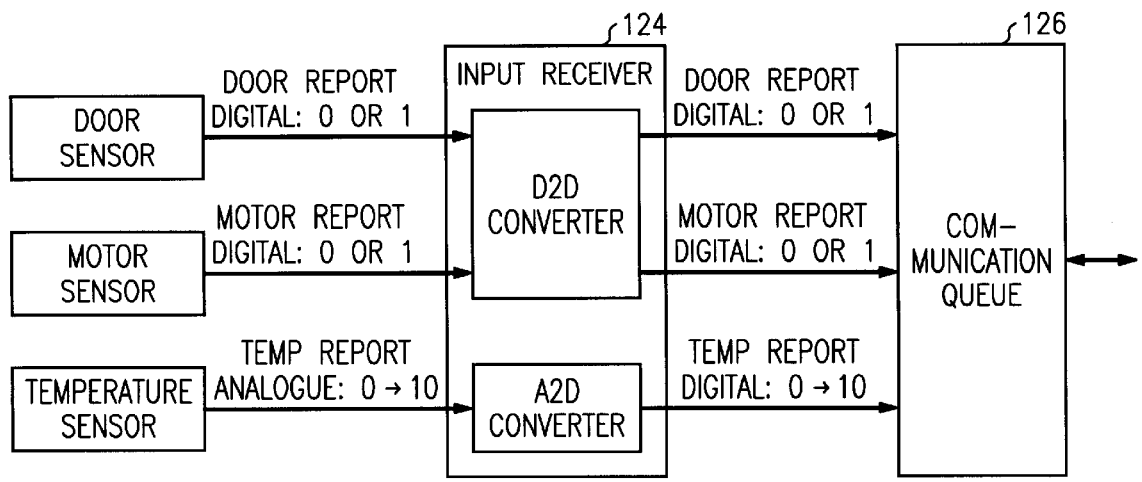
FIG. 3 is a block diagram showing an example of the input receiver and communication queue.

As shown in FIG. 3, input receiver 124 has digital to digital and analog to digital converters to convert signals to digital form. The communication queue is a type of buffer to keep digital data in order. In addition to the information needed for control purposes, the signals carry irrelevant information. The task of the FSM dispatcher 130 is to send the input signals to the FSM manager 102 and the right finite state machine at the right time.

Figure 4:
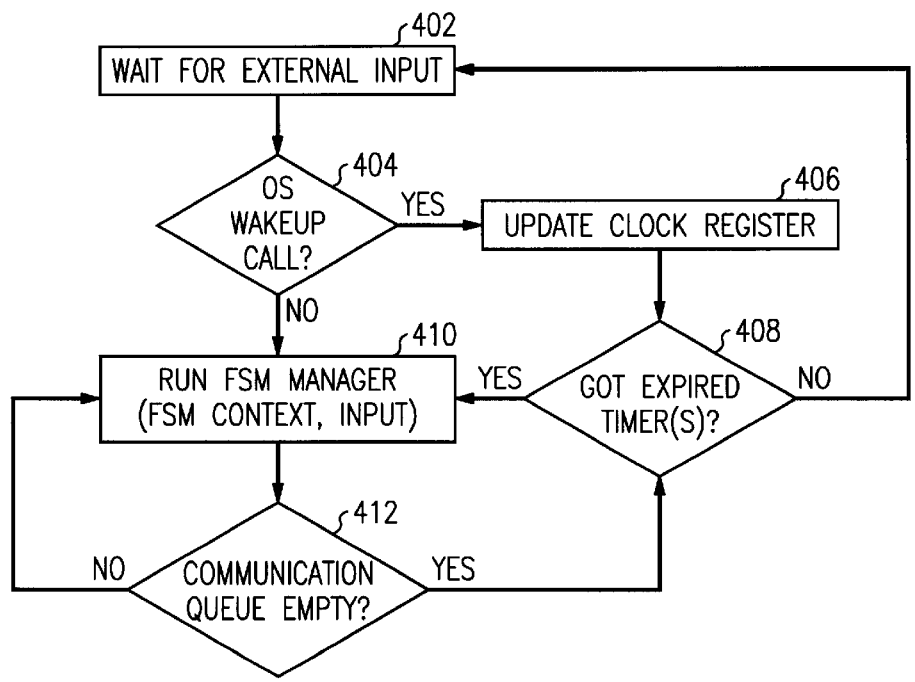

Referring now to FIG. 4, a method 400 of running the FSM dispatcher 130 is shown. Method 400 waits for an external input to reach input receiver 124, which stimulates action. Next, method 400 progresses to decision 404 see if an operating system wakeup call is needed to the processor that will run method 400. If the answer at decision 404 is 'yes' the method progresses to step 406, which updates clock register 132 with a time period to handle the input and then progresses to decision 408. Decision 408 determines if the time allotted for processing the input has expired. If the time has not expired, the method loops back to step 402 and if the time has expired, the method progresses to action 410. Action 410 is also the action that the method progresses to if at decision 404 the determination is that no OS wakeup call is needed. Action 410 runs the FSM Manager, which includes sending the FSM Manager the context, i.e. which FSM it is going to operate as for the next set of input signals, and the inputs signals themselves. At this point, a specific instance of a finite state machine is processing input data using FSMcc 102A, very much like in Wagner. Next, decision 412 determines if the communications Queue 126 is empty, i.e. there is no more data for this instance, and if the answer is yes, then the method progresses to decision 408 to see if the timer has expired, and if the answer is no then the queue 412 is accessed and further input data is processed by the present context and FSMcc 102A, and action 410 is re-ran. At some point, the timer will expire, then the input has all been processed and the method 400 goes back to action 402 to wait for the next input.

Inside the FSM manager 102, the input signals go to the input pre-processor 109. The task of the input pre-processor 109 is to extract the true control information not extracted by input receiver 124 and pass it further to the FSMcc logical processing unit 102A.

In one embodiment FSMcc 102A and the disk storage 105 can be based and served by a commercial operating system or a dedicated solution. The input preprocessor 109 and the output postprocessor 110 may be dedicated devices if they perform specialized tasks. They can be built using standard features of the computer system. They can be parts of the same hardware and software as the rest of the FSMcc system.

The FSMcc 102A produces outputs in a normalized form representing the action to be performed. These FSMcc outputs are sent through output register 112 and processed by output postprocessor 110. The output postprocessor 110 generates signals required by specific drivers, attenuators, relays, motors and other output actuators. Examples of an output postprocessor 110 are also given in the Wagner patent.

Input preprocessor 109 may receive parameters 224 and output postprocessor 110 may receive parameters 308. The parameters adapt the preprocessor and postprocessor to a specific variant of the controlled system 106. The parameters are loaded either from the development system 104 or from the disk storage 105.

Referring now to FIG. 5, a method 500 used by the output post processor is shown. Method 500 is how the output postprocessor 110, shown in FIG. 2, handles performing actions that affect the system outside of the FSM community, i.e. calls an to OUTPUT DRIVER 108, and inside the FSM community, i.e. invokes community framework primitives for everything else.

The post processor 110 receives parameters from development system 104 and disk storage 105. It also receives community information from community specification table and community RAM. Thus, post processor has a lot of information about the appropriate outputs. Thus, output post processor 110 can make the six way decision 502 of method 500. According to information it has already received, the output postprocessor determines if a new (e.g. not currently-running) FSM needs to be created to provide the desired output type. If so, method 500 progresses to action 504 where output post processor 110 allocates space in community RAM for the new FSM to operate with. If a particular FSM will not be needed for a while, output post processor 110 progresses to action 506 where the postprocessor de-allocates space in community RAM for a removed FSM. If the type of output desired is an input to this or a subsequent FSM, the method 500 progresses to action 508 where the output post processor adds an input into the communication queue 126, as a type of feedback or inter FSM message.

The next two decision paths concern time. If method 500 desires a start timer output, the method progresses to decision 510. Decision 510 determines if an OS wakeup is running. If the answer is yes, then the method progresses to action 514 where the present timer is added to the timer queue. If the answer is no, then the method progresses to action 512 where the postprocessor sends a wakeup request, which should be answered yes with a timer value. After action 512, the method progresses to action 514, where the timer value is added to the timer queue. On the other hand, if method 500 desires to stop a timer, the method progresses to action 516 where the present timer is removed from the timer queue. Next, the method progresses to decision 518 which determines if there are any timers left in the timer queue. If the answer is yes, the method branches back to the action 516 which removes present timer from the timer Queue. This 518–516 loop will be repeated until all timers are removed from the queue, then the method progresses to decision 520. At decision 520, the method determines if the operating system wakeup is running. The no answer requires no action since no wakeup is desired, so no path from a 'no' decision. The 'yes' decision means that a wakeup is expected, so the method progresses to action 522, which disables the outstanding wakeup.

Lastly, decision 502 may determine that it wants some other kind of action, in which case the method progresses to action 524 which invokes an output driver for the presently running FSM.

Referring now to FIG. 6, an example of a COMMUNITY SPECIFICATION TABLE 160 as shown in FIGS. 1 and 2, is shown. This example is for a ceiling fan which might have one controller FSM, one "motor" FSM, and many "light" FSMs. By having multiple FSMs, each for a separate but cooperating function of the overall task, there is virtually no limit to the processes or the apparatus that can be controlled. The table is exactly analogous to the "APPLICATION LOGIC TABLE" from U.S. Pat. No. 5,301,100 by Wagner except that patent described how one FSM behaves while the present invention describes how to create, destroy, and communicate with every type of FSM in the community. Similarly, the individual FSM names in FIG. 6 represent three different FSMs. Each of the FSMs is created very similarly to how they were created in Wagner. The main differences being, since there are multiple FSMs in the present invention, provision in the community is made for cooperation between FSMs, communication between FSMs and activation and destruction of FSMs to provide functionality sequentially and then leave the computing system 101 with assets for the next FSM.

Various changes and modifications in the invention may be made without departing from its scope which is limited only by the following claims and their equivalents.

What is claimed is:

1. A method of specifying a control system for a process or an apparatus to be controlled comprising:
    a) identifying multiple detectable conditions associated with the controlled process or apparatus;
    b) providing multiple finite state machines to control the controlled process or apparatus, each finite state machine having a name and each finite state machine having an input preprocessor, an application logic table and an output post processor;
    c) providing each finite state machine with separate input names for each detectable condition controlled by the respective finite state machine wherein the presence of the respective detectable conditions is indicated by the respective names having an asserted value;
    d) storing the input names;
    e) identifying one or more control actions which can be taken by each finite state machine to control the process or apparatus;
    f) providing a separate output name for each identified control action of each finite state machine;
    g) storing the output names;
    h) automatically producing a application logic tables for each finite state machine, respectively, wherein each input name is represented by a predetermined number of bit positions and combinations of input names are logically coupled together by implied AND and OR operators and wherein such combinations of input names are associated with output names;
    i) storing the tables; and
    j) loading each of the application logic tables into the control system;
        wherein each of the multiple finite state machines is automatically provided by operation of community specifications on inputs and outputs; and
        wherein at least one of the multiple finite state machines is dynamically established for use and tom-down when not in use to free up available memory.

2. A method of specifying a control system for a process or an apparatus to be controlled comprising:
    a) identifying multiple detectable conditions associated with the controlled process or apparatus;
    b) providing multiple finite state machines to control the controlled process or apparatus, each finite state machine having a name and each finite state machine having an input preprocessor, an application logic table and an output post processor;
    c) providing each finite state machine with separate input names for each detectable condition controlled by the respective finite state machine wherein the presence of the respective detectable conditions is indicated by the respective names having an asserted value;
    d) storing the input names;
    e) identifying one or more control actions which can be taken by each finite state machine to control the process or apparatus;
    f) providing a separate output name for each identified control action of each finite state machine;
    g) storing the output names;
    h) automatically producing a application logic tables for each finite state machine, respectively, wherein each input name is represented by a predetermined number of bit positions and combinations of input names are logically coupled together by implied AND and OR operators and wherein such combinations of input names are associated with output names;
    i) storing the tables; and
    j) loading each of the application logic tables into the control system;
        wherein each of the multiple finite state machines is automatically provided by operation of community specifications on inputs and outputs; and
        wherein finite state machines communicate with each other by means of the output postprocessor of one finite state machine transmitting data to the communication queue and the finite state machine dispatcher taking the data from the communication queue and delivers this data to the input preprocessor of the next finite state machine.

3. A method of specifying a control system for a process or an apparatus to be controlled comprising:
    a) identifying multiple detectable conditions associated with the controlled process or apparatus;
    b) providing multiple finite state machines to control the controlled process or apparatus, each finite state machine having a name and each finite state machine having an input preprocessor, an application logic table and an output post processor;
    c) providing each finite state machine with separate input names for each detectable condition controlled by the respective finite state machine wherein the presence of the respective detectable conditions is indicated by the respective names having an asserted value;

d) storing the input names;

e) identifying one or more control actions which can be taken by each finite state machine to control the process or apparatus;

f) providing a separate output name for each identified control action of each finite state machine;

g) storing the output names;

h) automatically producing a application logic tables for each finite state machine, respectively, wherein each input name is represented by a predetermined number of bit positions and combinations of input names are logically coupled together by implied AND and OR operators and wherein such combinations of input names are associated with output names;

i) storing the tables; and j) loading each of the application logic tables into the control system;

wherein each of the multiple finite state machines is automatically provided by operation of community specifications on inputs and outputs;

wherein finite state machines communicate with each other by means of the output postprocessor of one finite state machine transmitting data to the communication queue and the finite state machine dispatcher taking the data from the communication queue and delivers this data to the input preprocessor of the next finite state machine; and wherein at least one of the multiple finite state machines is dynamically established for use and tom-down when not in use to free up available memory.

* * * * *